United States Patent Office 3,657,380
Patented Apr. 18, 1972

3,657,380
HIGH TEMPERATURE RESISTANT COATING COMPOSITION OF AN AROMATIC POLYAMIDE AND AN EPOXY RESIN
James C. Fang, Media, Pa., assignor to E. I. du Pont de Nemours and Company, Wilmington, Del.
No Drawing. Filed Dec. 9, 1969, Ser. No. 883,646
Int. Cl. C08g 45/08, 45/10, 45/12
U.S. Cl. 260—831                                       3 Claims

ABSTRACT OF THE DISCLOSURE

A coating composition that is resistant to high temperatures and is particularly useful as a temperature resistant coating for metals, as a wire enamel, as an impregnant for forming circuit boards and as a high temperature adhesive is the subject of this invention. The coating composition contains as the film-forming constituents:

(A) an aromatic polyamide which preferably has at least one terminal carboxyl group and has the following recurring structural unit:

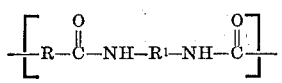

wherein R and R¹ are divalent aromatic radicals; and
(B) an epoxy resin that is thermally stable.

BACKGROUND OF THE INVENTION

This invention relates to a coating composition that is resistant to high temperatures and in particular to a coating composition of a polyamide and an epoxy resin.

Polyamide polymers are well known and have been prepared by a variety of methods. The following patents illustrate various polyamide polymers and methods of making these polymers. Hare et al. U.S. Pat. 2,989,495, issued June 20, 1961; Hill et al. U.S. Pat. 3,006,899, issued Oct. 31, 1961; Stephens U.S. 3,049,518, issued Aug. 14, 1962; Beste et al. U.S. 3,068,188, issued Dec. 11, 1962; Kwolek et al. U.S. 3,063,966, issued Nov. 13, 1962; Hill et al. U.S. 3,094,511, issued June 18, 1963 and Stephens U.S. 3,296,201, issued Jan. 3, 1967. Epoxy resins, for example, of epichlorohydrin and diphenylol propane and epichlorohydrin and phenol formaldehyde also are well known. However, these resins by themselves do not provide coatings which are flexible and resistant to high temperature which are properties required, for example, of high temperature wire enamels and high temperature coatings for metal sheets, and for impregnates used to form temperature resistant sheet materials.

By utilizing a wholly aromatic polyamide in combination with a thermally stable epoxy resin, flexible, durable, abrasion resistant and high temperature resistant coatings for wire, sheet metal substrates can be prepared. The composition can be used also as an impregnant to form circuit boards and can be used as an adhesive or as a paint.

SUMMARY OF THE INVENTION

The liquid coating composition of this invention contains 5–80% by weight of film-forming constituents and 95–20% by weight of the solvent for the film-forming constituents in which the film-forming constituents consist essentially of (A) 25–99% by weight, based on the weight of the film-forming constituents, of an aromatic polyamide that has the following recurring structural unit

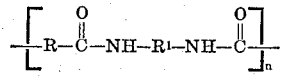

wherein R and R¹ are divalent aromatic radicals, and $n$ is a positive integer that is sufficiently large to provide a film-forming polymer that has an inherent viscosity at 25° C. of at least 0.08 measured at about 0.5% polymer solids in N-methyl pyrrolidone; and the polyamide preferably has at least one terminal carboxyl group; and correspondingly, (B) 1–75% by weight, based on the weight of the film-forming constituents, of a thermally stable epoxy resin.

DESCRIPTION OF THE INVENTION

The novel coating composition of this invention preferably contains 20–35% by weight of the film-forming constituents and preferably, the film-forming constituents consist of 75–95% by weight of the aromatic polyamide, and correspondingly, 5–25% by weight of the thermally stable epoxy resin.

The aromatic polyamide used in this invention preferably has at least one terminal carboxyl group and has the following recurring structural unit:

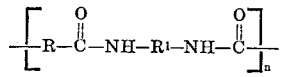

where $n$ is an integer, preferably about 1–1000 and is sufficiently high to provide a film-forming polymer having an inherent viscosity at 25° C. of at least 0.08 preferably, 0.15–4, measured at about 0.5% polymer solids in N-methyl pyrrolidone and wherein R and R¹ are each divalent aromatic radicals.

Inherent viscosity which is directly related to molecular weight of the polymer is defined as follows:

$$\text{Inherent viscosity} = \frac{\text{Natural logarithm of the relative viscosity}}{C}$$

where the relative viscosity is the ratio of the solution viscosity to the solvent viscosity and C is the concentration of solute in solution measured as grams of polymer per 100 milliliters of solution.

Preferably, the R radical of the polyamide is either

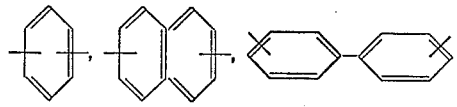

or

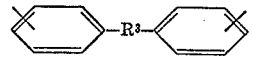

where R³ is either an alkylene radical having 1–3 carbon atoms,

—O—, —S— or —SO₂—. The R¹ radical is either

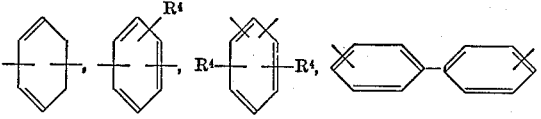

or

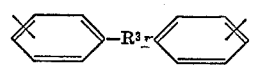

where $R^3$ is defined above and $R^4$ is an alkyl group of 1–3 carbon atoms.

The polyamide used in this invention preferably is prepared by reacting a dicarboxylic acid with an organic diisocyanate in a solvent at about 25–200° C. for about 0.5–3 hours. Preferably, a reaction temperature of 105–180° C. is used.

Typical solvents that are used to form the polyamide used in this invention are: N-methyl pyrrolidone, dimethyl acetamide, trialkyl amines, such as triethylamine, tributylamine, N-methyl morpholine, tetramethylurea, pyridine, and the like.

The following aromatic dicarboxylic acids are useful for forming the polyamide used in this invention:

isophthalic acid,
terephthalic acid,
1,5-naphthalene dicarboxylic acid,
1,4-naphthalene dicarboxylic acid,
1,6-naphthalene dicarboxylic acid,
1,7-naphthalene dicarboxylic acid,
2,4-naphthalene dicarboxylic acid,
2,5-naphthalene dicarboxylic acid,
2,6-naphthalene dicarboxylic acid,
2,7-naphthalene dicarboxylic acid,
2,8-naphthalene dicarboxylic acid, and the like;

2,2'-bibenzoic dicarboxylic acid,
3,3'-bibenzoic dicarboxylic acid,
4,4'-bibenzoic dicarboxylic acid,
2,3'-bibenzoic dicarboxylic acid,
3,4'-bibenzoic dicarboxylic acid, and the like;

2,2'-isopropylidene dibenzoic acid,
3,3'-isopropylidene dibenzoic acid,
4,4'-isopropylidene dibenzoic acid,
2,3'-isoproylidene dibenzoic acid,
3,4'-isopropylidene dibenzoic acid,
2,2'-methylene dibenzoic acid,
3,3'-methylene dibenzoic acid,
4,4'-methylene dibenzoic acid,
2,2'-ethylene dibenzoic acid,
4,4'-ethylene dibenzoic acid,
2,2'-hexafluoroisopropylidene dibenzoic acid,
4,4'-hexafluoroisopropylidene dibenzoic acid, and the like;

2,2'-ketodibenzoic acid,
3,3'-ketodibenzoic acid,
4,4'-ketodibenzoic acid,
2,2'-oxydibenzoic acid,
3,3'-oxydibenzoic acid,
4,4'-oxydibenzoic acid,
4,4'-thiodibenzoic acid,
2,2'-thiodibenzoic acid,
3,3'-thiodibenzoic acid, and the like;

2,2'-sulfonedibenzoic acid,
3,3'-sulfonedibenzoic acid,
4,4'-sulfonedibenzoic acid, and the like.

The following are preferred dicarboxylic acids used to form the polyamide used in this invention:

isophthalic acid,
terephthalic acid,
4,4'-bibenzoic dicarboxylic acid,
4,4'-isopropylidene dibenzoic acid,
4,4'-ketodibenzoic acid,
4,4'-oxydibenzoic acid,
4,4'-thiodibenzoic acid and
4,4-sulfonedibenzoic acid.

The following organic diisocyanates are useful for forming the polyamide used in this invention:

meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate, dialkyl benzene diisocyanates, such as methylpropylbenzene diisocyanate, methylethyl diisocyanate, and the like.

2,2'-biphenylene diisocyanate,
3,3'-biphenylene diisocyanate,
4,4'-biphenylene diisocyanate,
3,3'-dimethyl-4,4'-biphenylene diisocyanate, and the like;

methylene-bis-(4-phenyl isocyanate),
ethylene-bis-(4-phenyl isocyanate),
isopropylidene-bis-(4-phenyl isocyanate),
hexafluoroisopropylidene-bis-(4-phenyl isocyanate), and the like;

2,2'-oxydiphenyl diisocyanate,
3,3'-oxydiphenyl diisocyanate,
4,4'-oxydiphenyl diisocyanate, and the like;

2,2'-ketodiphenyl diisocyanate,
3,3'-ketodiphenyl diisocyanate,
4,4'-ketodiphenyl diisocyanate, and the like;

2,2'-thiodiphenyl diisocyanate,
3,3'-thiodiphenyl diisocyanate,
4,4'-thiodiphenyl diisocyanate, and the like;

2,2'-sulfonediphenyl diisocyanate,
3,3'-sulfonediphenyl diisocyanate,
4,4'-sulfonediphenyl diisocyanate, and the like.

Preferred aromatic diisocyanates used to form the polyamide used in this invention are toluene diisocyanate, and in particular, a blend of toluene-2,4-diisocyanate and toluene-2,6-diisocyanate, xylene diisocyanate, m-phenylene diisocyanate, and 4,4' - methylene-bis - (4 - phenyl isocyanate).

The epoxy resin used to form the novel coating composition of this invention is thermally stable. A variety of these thermally stable epoxy resins can be used provided the resin is compatible with the aromatic polyamide.

Epoxy resins of the following formula can be used:

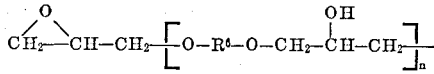

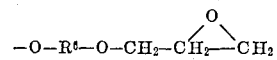

where $R^6$ is a divalent aromatic radical and $n$ is an integer sufficient to give a Gardner Holdt viscosity of 25° C. of about C—$Z_5$. These epoxy resins preferably are prepared from epichlorohydrin and Bisphenol A or Bisphenol F. Bisphenol A is diphenylol propane and $R^6$ then is

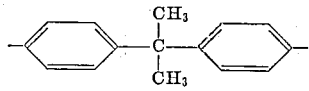

Bisphenol F is diphenylol methane and $R^2$ then is

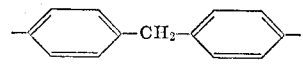

These resins can be prepared according to the process of Owen U.S. 2,582,985, issued Jan. 22, 1952; Zech U.S.

2,538,072, issued Jan. 16, 1951; Owen U.S. 2,615,007, issued Oct. 21, 1952. These epoxy resins are commonly sold under the trademark of "Epon" resins.

Epoxy resins of epichlorohydrin and a heat reactive condensate, such as phenol/formaldehyde condensates can be used. These resins are commonly known as epoxy novolac resins.

The epoxy resin can be blended with the aromatic polyamdie, for example, at room temperature, to form a thermo-setting coating composition which is coalesced to a film at elevated temperatures. The epoxy resin can be reacted with the carboxyl groups of the polyamide at an elevated temperature, for example, about 125–180° C., to form a coating composition that has the characteristics of a lacquer.

Up to 30% by weight, preferably 3–25% by weight, based on the weight of the film-forming polymer, of a thermosetting resin can be added to the novel coating composition of this invention, such as phenol/formaldehyde, urea/formaldehyde, melamine/formaldehyde, alkylated melamine/formaldehyde, benzoguanamine/formaldehyde, and the like. One particularly useful thermosetting resin that is compatible with the novel coating composition and gives a high quality product is phenol/formaldehyde.

An air-dry composition can be formed by adding about 3–30% by weight, based on the weight of the film-forming polymer, of a polyisocyanate to the novel coating composition. One preferred polyisocyanate is a polyalkylene polyphenyl isocyanate, such as polymethylene polyphenyl isocyanate.

Pigments can be used in the novel coating composition of this invention in the amounts of 0.1–50.0% pigment volume concentration. Examples of the great variety of pigments which are used in the novel coating composition of this invention are metallic oxides, preferably titanium dioxide, zinc oxide, iron oxide and the like, metal hydroxides, metal flakes, chromates, such as lead chromate, sulfides, sulfates, carbonates, carbon black, silica, talc, china clay, organic dyes, lead and iron blues, organic reds, maroons, and the like, organic dyes and lakes, etc.

The novel compositions of this invention can be applied to a variety of substrates, for example, metal, wires, glass, plastics, such as polyimides, fluorocarbon polymers and the like, by any of the usual application methods, such as spraying, dipping, brushing, flow coating and the like. These coatings can be air dried or baked at about 93–150° C. to increase the drying rate. The resulting coating is about 0.1–6 mils thick, preferably, 1–3 mils thick.

The novel coating composition of this invention can be used as a wire enamel. For this use, the novel coating composition is diluted to a 20–30% polymer solids content, using a solvent, such as N-methyl pyrrolidone. This diluted composition is coated onto a wire by using commercial wire coating equipment under ordinary coating conditions. The curing oven temperature is about 290° C. to 370° C. at the bottom and increases about to 480° C. at the top. Wire coating speeds up to 50 feet per minute can be used with resulting increase in diameter of the uncoated wire of 0.1–6 mils.

The novel coating composition of this invention can be used over conventional wire coatings, such as acrylics polyamides, polyimides, polyesterimides, polyesters, alkyd resins, polyamideimides, polyurethenes, and the like, to give a coating with superior electrical properties. For example, the electrical dissipation factor as elevated temperatures, cut-through resistance and dielectric strength of wires over-coated with the novel composition of this invention are properties which are increased. Also, the novel coating composition may be used in alternating layers with other conventional enamels on a wire or an electrical conductor or in any other desirable multilayer combination with other enamels. For example, a metal conductor having a polymeric coating of about 0.1–5 mils thick of the above conventional enamels can be over-coated with about a 0.1–2 mil thick layer of the coalesced novel coating of this invention and provide the conductor with excellent electrical properties.

One particular cross-linked polyester wire coating over which the novel composition of this invention can be applied is a polyester of ethylene glycol, isophthalic acid, terephthalic acid, dimethyl terephthalate cross-linked with tris-(2-hydroxyethyl) isocyanurate. The combination of a layer of the novel polyamide coating composition of this invention over the above described polyester gives a high quality wire enamel with excellent electrical properties.

One particular use for the novel coating composition of this invention is to impregnate temperature resistant substrates which are used, for example, as circuit boards. The substrate is impregnated with the novel composition and heated to about 135 to 235° C. for about 15 to 30 minutes. Typical woven or non-woven substrates that can be used are of glass fibers, high temperature polyamides, polyimides, and the like.

One preferred impregnated sheet is of woven glass fibers impregnated with the novel coating composition of this invention that is then baked at 130–230° C. for 15–30 minutes. The impregnated sheet can be cut into panels and consolidated under heat and pressure to form a laminate. Typical laminating conditions are, for example, 290° C. for 15 minutes at a pressure of about 10 pounds per square inch. The pressure is then increased to about 500 pounds per square inch for about 30 minutes to form the laminate. A copper foil may be adhered to one or both sides of the laminate to form a circuit board.

The following examples illustrate the invention.

EXAMPLE 1

A coating composition is formulated by reacting the following ingredients:

| | Parts by weight |
|---|---|
| Portion 1: | |
| Methyl pyrrolidone | 246.00 |
| Isophthalic acid | 86.34 |
| Terephthalic acid | 37.07 |
| Portion 2: | |
| "Hylene" TM (blend of toluene-2,4-diisocyanate and toluene 2,6 - diisocyanate in a weight ratio of 80/20) | 131.30 |
| Portion 3: | |
| N-methyl pyrrolidone | 82.30 |
| Portion 4: | |
| N-methyl pyrrolidone | 86.30 |
| Liquid Epoxy resin ("Epon" 828 [1]) | 14.89 |
| Portion 5: | |
| Xylol | 85.10 |
| Portion 6: | |
| Xylol | 166.20 |
| Total | 935.50 |

[1] "Epon" 828—a liquid epoxy resin having a Gardner Holdt viscosity of 100–160 poises, an epoxide equivalent, i.e., grams of resin containing one gram of epoxide, of 180–195 and has the following structural formula:

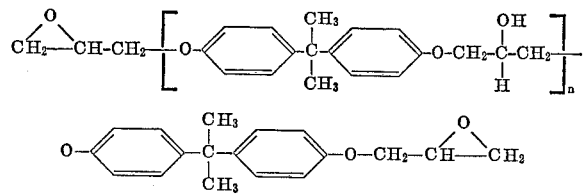

where $n$ is an integer sufficiently large to provide the above viscosity.

Portion 1 is charged into a reaction vessel equipped with a stirrer, condenser, thermometer and a heating jacket, and is thoroughly mixed. The mixture is blanketed with nitrogen and heated to about 100° C. During the reaction, the ingredients are under constant agitation.

Portion 2 is then slowly charged into the vessel over a 15-minute period, and the temperature of the reaction mixture is increased to about 105° C. and an exothermic reaction occurs. At the completion of the exothermic reaction, Portion 3 is charged into the vessel, then the ingredients are heated to 150° C. for about 1 hour and then the heat is increased to 180° C. for ½ an hour.

A 100 gram sample is then removed from the reaction vessel and diluted with 50 grams of N-methyl pyrrolidone. The Brookfield viscosity of this sample at 25° C. using a No. 4 spindle at 20 revolutions per minute should be about 30–40 poises.

If the viscosity is below 10 poises, an additional 2.50 parts by weight of toluene diisocyanate are added; if the viscosity is 10–20 poises, 1.00 parts by weight of toluene diisocyanate are added and if the viscosity is 21–29 poises, 0.50 part by weight of toluene diisocyanate is added. After the addition of the toluene diisocyanate, the reaction mixture is heated to about 180° C. for about ½ hour.

Portion 4 is then added and the batch is held at about 150° C. for ½ hour. Portion 5 is charged into the batch and the batch is heated and maintained at its reflux temperature for about 1 hour. Portion 6 is then added and the mixture is filtered through a 30 micron filter.

An 18 AWG copper wire is coated with the above prepared coating composition using the wire coating procedure as outlined in Bullitt et al. U.S. 3,069,375, column 10, lines 48–66. The increase in the diameter of the wire due to the coating process is about 3 mils.

The resulting coated wires are evaluated according to recognized test methods described in columns 4 and 5 of Sanders U.S. Pat. 2,787,603, issued Apr. 2, 1957, and found to have excellent dielectric strength of the insulation, cut-through temperature, abrasion resistance and other electrical properties.

EXAMPLE 2

A coating composition is formulated by reacting the following ingredients:

|  | Parts by weight |
|---|---|
| Portion 1: |  |
| Isophthalic acid | 166 |
| N-methyl pyrrolidone | 340 |
| Portion 2: |  |
| "Hylene" TM (blend of toluene-2,4-diisocyanate and toluene - 2,6 - diisocyanate in a weight ratio of 80/20) | 172 |
| Total | 678 |

Portion 1 is charged into a reaction vessel equipped with a stirrer, condenser, thermometer and a heating jacket and is thoroughly mixed. Portion 2 is then slowly added over a ten minute period with constant agitation of the reaction mixture. The reaction mixture is slowly heated to about 130° C. and is maintained at about 130–140° C. for an hour. 200 Parts by weight of N-methyl pyrrolidone are then added. The resulting polymer solution has a solids content of about 31% and a Gardner Holdt viscosity at 25° C. of about Z–1. The inherent viscosity of the polymer is about 0.84.

About 70 parts by weight of a solution of 50% by weight of "Epon" 828 epoxy resin (described in Example 1) in xylene is blended at room temperature with the above prepared polyamide solution.

A three mil thick sheet of woven "Fiberglas" of a 450 yarn and a warp and fill count of 82 x 80 is impregnated with this polyamide-epoxy resin solution by immersing the sheet in the solution. The sheet is removed from the solution and excess solution is removed. The sheet is then baked at about 150° C. for 25 minutes to give a panel 0.006 inch thick.

The panel is then cut into three sheets of equal size and the sheets are stacked on a copper foil to form a laminate. The stack is subjected to 290° C. for 15 minutes at about 10 p.s.i. The pressure is then increased to 500 p.s.i. for 30 minutes. The resulting laminate has a high strength and excellent heat stability and is useful as a circuit board. Another copper foil may be laminated to the opposite side of the laminate if desired.

EXAMPLE 3

A coating composition is formed by blending the following ingredients:

|  | Parts by weight |
|---|---|
| Polyamide-epoxy coating composition (prepared in Example 1) | 10 |
| Polyisocyanate solution (50% by weight of polymethylene polyphenyl isocyanate in xylene) | 2 |
| Total | 12 |

The above coating composition is applied to a glass plate with a doctor blade and air-dried. The smooth clear, tough film formed on the plate has excellent adhesion to the glass plate.

The above coating composition is also applied with a doctor blade to a phosphatized aluminum plate. The plate is baked at about 90° C. for about 30 minutes. The resulting coating is smooth clear, tough and has excellent adhesion to the metal substrate.

What is claimed is:

1. A liquid coating composition comprising 5–80% by weight of film-forming constituents and 95–20% by weight of a solvent for the film-forming constituents, in which the film-forming constituents consist essentially of
   (A) 75–95% by weight, based on the weight of the film-forming constituents, of an aromatic polyamide having the following recurring structural unit $$\left[ -R-\overset{O}{\underset{\|}{C}}-NH-R^1-NH-\overset{O}{\underset{\|}{C}} \right]_n$$

wherein R is

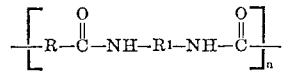

and $R^1$ is

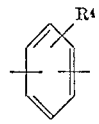

where $R^4$ is an alkyl group of 1–3 carbon atoms and wherein $n$ is an integer sufficiently large to provide an inherent viscosity at 25° C. of about 0.15–4 measured at about 0.5% polymer solids in N-methyl pyrrolidone; and correspondingly,
   (B) 5–25% by weight, based on the weight of the film-forming constituents, of an epoxy resin having the following structural units

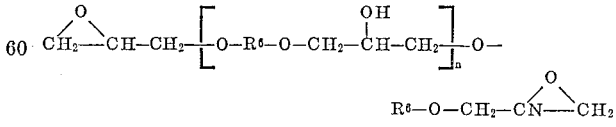

wherein $R^6$ is selected from the group consisting of

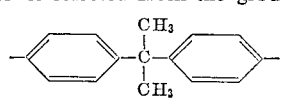

and

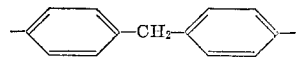

and $n$ is an integer sufficiently large to give a Gardner Holdt viscosity at 25° C. of about C to $Z_5$; and the composition contains an additional 3–25% by weight of the film-forming constituents of a thermosetting resin selected from the group consisting of phenol/formaldehyde, urea/formaldehyde, alkylated melamine/formaldehyde and benzoquanamine/formaldehyde.

2. A liquid coating composition comprising 5-80% by weight of film-forming constituents and 95-20% by weight of a solvent for the film-forming constituents, in which the film-forming constituents consist essentially of
 (A) 75-95% by weight, based on the weight of the film-forming constituents, of an aromatic polyamide having the following recurring structural unit

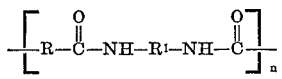

wherein R is

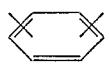

and $R^1$ is

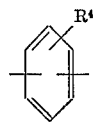

where $R^4$ is an alkyl group of 1-3 carbon atoms and wherein $n$ is an integer sufficiently large to provide an inherent viscosity at 25° C. of about 0.15-4 measured at about 0.5% polymer solids in N-methyl pyrrolidone; and correspondingly, (B) 5-25% by weight, based on the weight of the film-forming constituents, of an epoxy resin having the following structural units

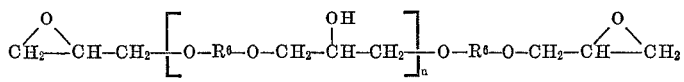

wherein $R^6$ is selected from the group consisting of

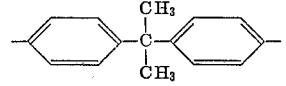

and

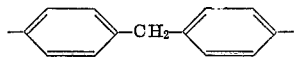

an $n$ is an integer sufficiently large to give a Gardner Holdt viscosity at 25° C. of about C to $Z_5$; and the composition contains an additional 3-30% by weight of the film-forming constituents of a polyisocyanate.

3. The coating composition of claim 2 in which the polyisocyanate is polyalkylene polyphenyl isocyanate.

References Cited
UNITED STATES PATENTS

| | | | |
|---|---|---|---|
| 3,261,882 | 7/1966 | Gorton | 260—830 P |
| 3,094,511 | 6/1963 | Hill | 260—78 R |
| 3,336,415 | 8/1967 | Kennedy | 260—830 P |
| 3,449,280 | 6/1969 | Frigstad | 260—830 P |
| 3,462,337 | 8/1969 | Gorton | 260—830 P |

PAUL LIEBERMAN, Primary Examiner

U.S. Cl. X.R.

117—72, 75, 128.4, 138.8 D, F, N, UA, R, 161 L, LN, P, UN, ZB; 260—37 Ep, 38, 39 R, M, SB, 830 P, 834

UNITED STATES PATENT OFFICE
CERTIFICATE OF CORRECTION

Patent No. 3,657,380  Dated April 18, 1972

Inventor(s) James C. Fang

It is certified that error appears in the above-identified patent and that said Letters Patent are hereby corrected as shown below:

Claim 1, column 8, line 61, delete the following formula

"  "

and insert the following formula

-- 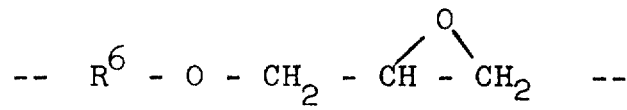 --

Signed and sealed this 29th day of August 1972.

(SEAL)
Attest:

EDWARD M. FLETCHER, JR.  ROBERT GOTTSCHALK
Attesting Officer  Commissioner of Patents